C. C. RICH.
HYDRAULIC TRANSMISSION MECHANISM.
APPLICATION FILED JULY 23, 1910.
1,156,816.
Patented Oct. 12, 1915.
2 SHEETS—SHEET 1.
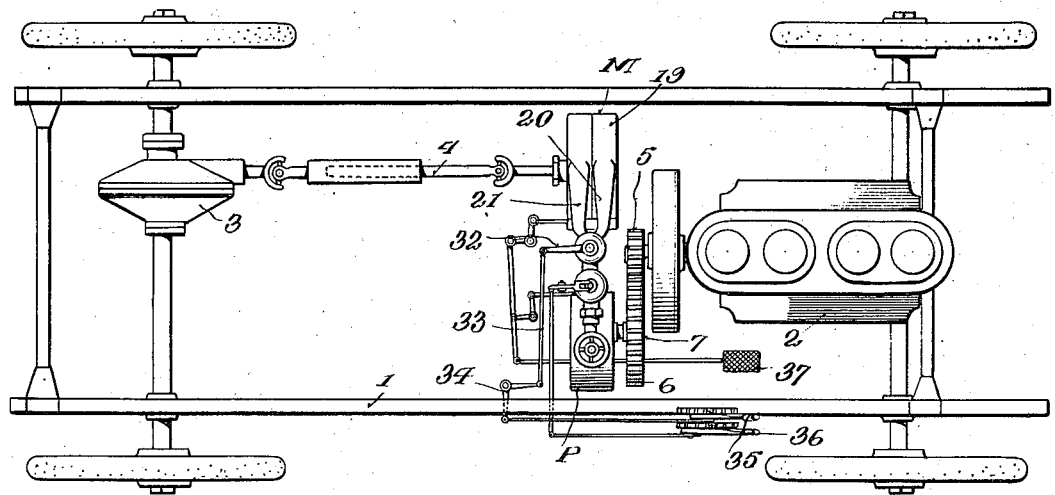
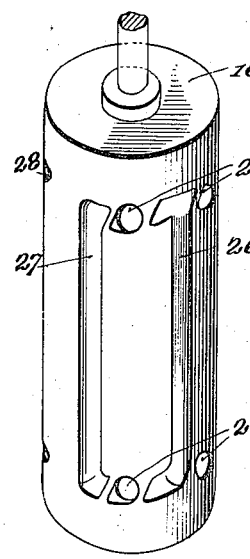
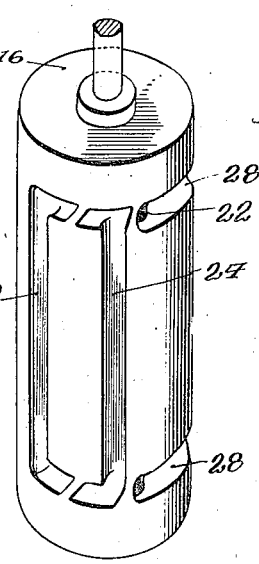
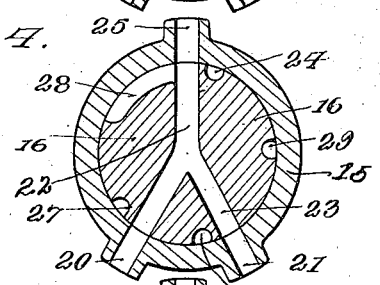
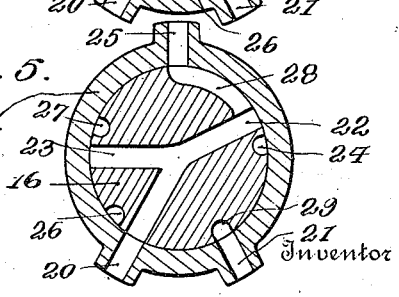
Witnesses
Inventor
C. C. Rich
By
Attorneys

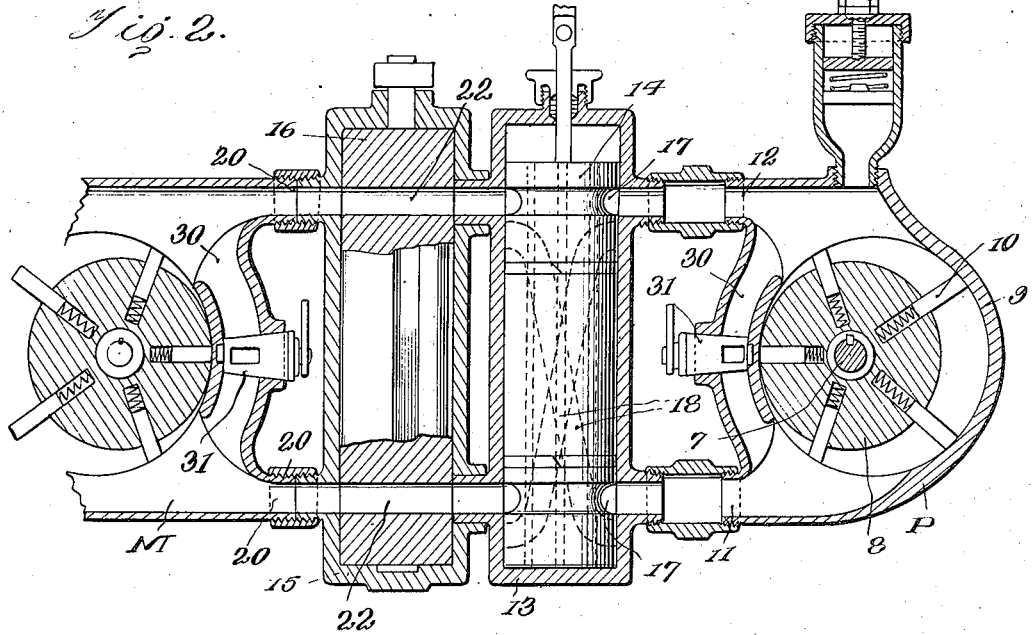
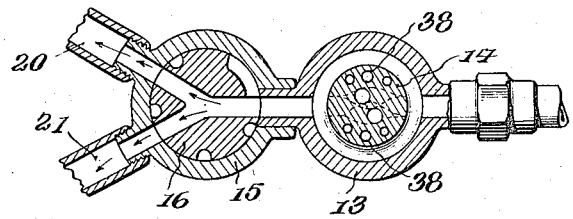
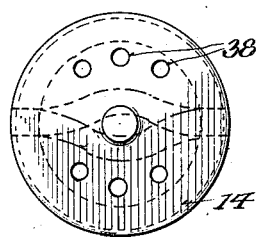
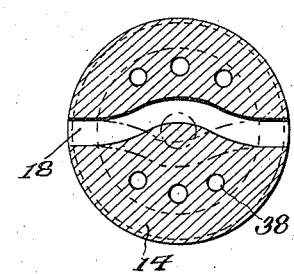

UNITED STATES PATENT OFFICE.

CHARLES C. RICH, OF MOUNT VERNON, NEW YORK, ASSIGNOR TO THE HYDRO-KINETIC TRANSMISSION COMPANY, OF MOUNT VERNON, NEW YORK, A CORPORATION OF MAINE.

HYDRAULIC TRANSMISSION MECHANISM.

1,156,816.  Specification of Letters Patent.  Patented Oct. 12, 1915.

Application filed July 23, 1910. Serial No. 573,566.

*To all whom it may concern:*

Be it known that I, CHARLES C. RICH, citizen of the United States, residing at Mount Vernon, in the county of Westchester and State of New York, have invented certain new and useful Improvements in Hydraulic Transmission Mechanism, of which the following is a specification.

This invention comprehends certain new and useful improvements in hydraulic transmission mechanism, such as is shown in my companion application, Serial No. 573,567, filed on the 23rd day of July, 1910, and is designed particularly for use in automobiles, motor trucks, and other self-propelled vehicles, although it is to be understood that it is applicable for use generally wherever it is desired to transmit motion from one shaft to another.

The invention has for its primary object a mechanism of this character which will be compact, in which the weight will be evenly distributed, which will be flexible in its action, efficient in operation and capable of being easily controlled and in which the connections for the fluid driving medium will be reduced in length to a minimum, piping being entirely eliminated.

The invention also has for its object in mechanism of this type, an improved arrangement of valves whereby a single controlling valve is used to control the action of a plurality of motors, the valve mechanism also including an improved reversing valve which is preferably located between the pump of the device and the speed controlling valve which is connected to the plurality of hydraulic motors, whereby the necessity of a reversing valve for each hydraulic motor is avoided, together with its incidental complications and other disadvantages.

A further object of the invention is a hydraulic transmission mechanism embodying both a speed controlling valve and a reversing valve, either of which may be detached without disturbing the other or the remaining parts of the mechanism, thereby adding to the efficiency and accessibility of the parts should any detachment and replacement become necessary.

A further object of the invention is an improved mechanism of this type in which the reversing valve, which is interposed between the pump or hydraulic motor or motors to change in the latter the direction of flow of the liquid, is formed with relatively large and direct passages extending therethrough for the purpose of passing the liquid from the pump to the motors in a direction to propel the vehicle for instance in a forward direction, thereby eliminating as far as possible friction when going ahead, the more tortuous passages in said valve that are used for the purpose of changing the direction of flow being only brought into play on the reverse, where high speed is not an essential and hence where it is not so important to reduce friction to a minimum.

A further object of the invention is a reversing valve in the form of a piston mounted within a cylinder and movable longitudinally therein in its operation, said valve or piston being formed with any desired number of passages extending therethrough from end to end, whereby to allow for displacement and the relatively free movement of the piston, the said passages being so proportioned that they will prevent a too-speedy manipulation or movement.

The invention also has for its object a hydraulic transmission mechanism embodying a cut-out or by-pass in both pump and motor, whereby the operator may, at will, by bringing said by-pass into play, permit the rotors to run free and the fluid to circulate around in the casings, the direction of flow being continuous in a constant circumferential path, whereby all angles or angular changes in the direction of flow and the consequent friction are avoided. And the invention has for a further object a cut-out or by-pass as just above specified, which is independent of all other controls, whereby the operator, say of an automobile, may instantly throw out the operative connection between the pump and motor or motors, without shifting or changing the speed controlling devices, and can subsequently gradually throw in the connection between the pump and motor to again start the machine without the necessity of touching or operating the speed controlling devices.

With these and other objects in view as will more fully appear as the description proceeds, the invention consists in certain constructions and arrangements and combinations of the parts that I shall hereinafter fully describe and claim.

For a full understanding of the invention, reference is to be had to the following description and accompanying drawings, in which:—

Figure 1 is a plan view of the running gear of a motor vehicle, illustrated conventionally, and showing one form or embodiment of my invention and the disposition thereof; Fig. 2 (Sheet 2) is a vertical longitudinal sectional view through the pump and the casing of the speed controlling and reversing valves; Fig. 2$^a$ is a horizontal sectional view, the pump casing being omitted; Figs. 3, 4 and 5 are enlarged horizontal sectional views, in the nature of diagrams, illustrating the speed controlling valve in three different positions, (see Sheet 1); Figs. 6 and 7 are perspective views of the body portion or spool of the speed controlling valve mechanism; and, Figs. 8 and 9 are horizontal sectional views through the piston of the reversing valve mechanism.

Corresponding and like parts are referred to in the following description and indicated in all the views of the drawings by the same reference characters.

In the present embodiment of the invention, the numeral 1 designates generally the framework or running gear of a motor vehicle, 2 the gasolene engine or other prime mover, 3 the ordinary differential case on the rear axle, and 4 the transmission shaft, all of these parts being selected for the purpose of illustration only and being of any desired or conventional construction or design.

The fly-wheel shaft of the prime mover 2 carries a spur pinion 5 which meshes with a relatively large gear wheel 6 secured on the rotor shaft 7 of a pump P of the rotary type. Obviously, the gear wheels 5 and 6 may be incased in any desired way to protect them from dust and for the purpose of carrying lubricant. So far as the rotor of the pump P and its blades are concerned, they may be of any construction or design, the rotor in the present instance being shown (see Fig. 2) at 8, mounted eccentrically within the pump casing 9 and carrying outwardly spring pressed blades 10. For the sake of clearness, I have designated the lower port 11 of the pump casing 9 as the inlet port and the upper port 12 as the outlet port for the driving fluid, although it is to be understood this designation is merely an arbitrary one as the direction of flow of course depends upon the direction in which the shaft 7 is rotated.

The ports 11 and 12 communicate with the interior of a cylinder 13 in which a longitudinally movable piston 14 is mounted, these parts constituting the main elements of the reversing valve mechanism. And the interior of the cylinder 13 communicates with the interior of a valve casing 15 which, with its spool or cylindrical valve 16, mounted to turn therein about its major axis, constitute the main parts of the speed controlling valve mechanism. As best seen in Fig. 2, the piston 14 is formed near its ends with annular peripheral grooves 17 which, when registering with the ports that are formed to establish communication between the interiors of the cylinder 13 and casing 15, permit the driving fluid to pass the piston 14 in a relatively direct manner with or through a relatively large passage, friction being thereby reduced and power conserved. In the position of the parts illustrated in this view, it will be understood that the pump P is passing the fluid through the valves in a direction to propel the machine forwardly, as will be hereinafter more specifically set forth.

In addition to the annular grooves 17, the piston 14 is formed with obliquely extending cross passages 18 which open at diametrically opposite points in the periphery of the piston, and hence it will be understood that when the piston is moved from the position illustrated in Fig. 2 in a direction to effect the registry of the ends of the passages 18 with the ports that lead through the cylinder 13, the fluid will be passed to the valve casing 15 in the reverse direction, so as to propel the vehicle rearwardly. Thus it will be seen that the more circuitous passages are only used on the reverse, where high speed is not an essential and the elimination of friction not so important.

As best illustrated in Fig. 1, the speed controlling valve mechanism is intended to serve a plurality of hydraulic motors, two of these being illustrated in the present instance, designated M and being of the duplex type, that is, two rotors mounted in the same casing 19, but in separate compartments thereof, and both keyed or otherwise secured upon the same section of the power transmission shaft 4. In this embodiment of the invention, 20 designates the upper and lower fluid inlet and outlet passages leading to and from one rotor or motor, and 21 designates the corresponding passages of the other motor.

Another object of my invention is to provide means whereby the fluid which is circulated by means of the pump P may be caused, at the will of the operator, to pass through and act upon one motor singly or both motors in conjunction, the first arrangement manifestly imposing upon the rotor of the driven motor the full force of the circulating driving fluid, and consequently securing high speed, while the second arrangement mentioned distributes the kinetic energy of the fluid and secures more power, as the area of impact is increased, but at a sacrifice of speed. It is the speed controlling valve mechanism which accomplishes this result, one embodiment thereof being illustrated in the accompanying drawings and being now more specifically described.

The spool or body portion 16 of the speed controlling valve mechanism is formed near its ends with transversely extending passages 22, each of which is branched, as at 23, so as to permit the fluid to pass, in a certain position of the spool, to and from both motors and the pump. The spool is also formed with several longitudinally extending peripheral grooves which, for the sake of perspicuity, will be described in connection with the three positions of the valve illustrated in Figs. 3, 4 and 5. For example, when the valve is in the neutral position illustrated in Fig. 3, one of these grooves, designated 24, will establish communication between the two pump connecting ports 25, and similar grooves 26 and 27 will respectively establish communication between the upper and lower passages 20 and 21 of the respective motors. Hence it will be understood that in this position the passages through the spool or body portion 16 are closed, and the fluid will be permitted to circulate freely out of one end of each motor casing and into the other end thereof and out of one end of the pump and into the other end thereof, there being no operative connection between the pump and hydraulic motors, but each being permitted to run free. In the second position illustrated in Fig. 4, the body portion of the valve is represented as having been turned around a distance sufficient to bring the branched passages 22 into registry with the ports 25, 21 and 20, the fluid being thereby passed from the pump into both motors simultaneously and passing back again from both motors simultaneously into the pump. In this relative arrangement of the parts, low speed will be the result, as the force of the fluid is distributed upon the rotors of both motors. In the third position illustrated in Fig. 5, the body portion 16 has been turned still farther around, one branch of each passage 22 being closed against the casing 15, while the other registers with the port 20, the main end of each passage being still in communication with a corresponding port 25 through the instrumentality of a circumferentially extending peripheral groove 28. Thus it will be seen that the fluid from the pump will be passed through only one of the motors and in order to provide for the free movement of the rotor of the other motor, an additional longitudinally extending peripheral groove 29 is brought into registry with both of the ports 21 of the then inoperative, but freely moving motor. In this relative arrangement of the parts, high speed will be the result, as the entire force of the fluid will act upon the rotor of one motor.

In order to cut out the operative connection between the pump and the hydraulic motors without the necessity of shifting the speed controlling valve mechanism or of having said mechanism in neutral position, I have provided both motor and pump, with a by-pass 30 of substantially arcuate form, each of said by-passes being controlled in any desired way, as by a turn plug or valve 31. From this it will be evident that when these by-passes are open, the fluid will merely circulate around in the casing, no power being transmitted. Hence, in order to stop the automobile for instance, it is only necessary to actuate the plugs 31, without disturbing the position of speed controlling valve mechanism; and to start up again it is only necessary to gradually close the by-pass 30. As the by-pass 30 is substantially of the curvature of the casing of which it forms a part, friction will be reduced to a minimum.

Any desired means may be employed for actuating the various parts, and it is thus to be understood that the mechanical elements illustrated in Fig. 1 for the purpose of showing an operative structure are not of the essence of the invention, but are merely arbitrary in their character. The spool 16 of the speed controlling valve mechanism may be provided at one end with a handle 32 which is connected by a link 33 to a bell crank 34, said bell crank being in turn connected to a hand lever 35. The piston 14 may be moved longitudinally by another hand lever 36. And the plugs or cocks 31 may be turned by a foot treadle 37 and the other connections shown.

The piston 14 is formed with longitudinal bores or passages 38 extending therethrough from end to end and of any desired number, these passages being for the purpose of permitting displacement so as to render practical and easy the movement of the piston. Obviously, these passages can be proportioned so as to prevent a too-speedy action.

From the foregoing description in connection with the accompanying drawings, the operation of my improved hydraulic transmission mechanism will be apparent, as the purposes and functions and relative movements and operations of the parts have been herein specifically described in connection with the description of their construction and relative arrangement. But to conclude with a general statement, it may be said that when the speed controlling valve mechanism is in the position illustrated in Fig. 3, no movement will be communicated from the pump to the motors, each being permitted to run free. For low speed ahead the valve 16 is shifted to the position illustrated in Fig. 4. For high speed ahead the valve is shifted to the position illustrated in Fig. 5. For reverse, the piston 14 is moved from the position illustrated in Fig. 2 to a position in which its oblique passages 18 will register with the ports passing through the cylinder 13, the speed in the reverse position being either high or low according to the position in which the speed controlling valve mechanism happens to be at the time. To throw out all connections (operation only being here considered) between the pump and hydraulic motors, the plugs 31 are opened.

It is to be particularly noted that the bypass passages 30 of the pump and motor, form part of the casing thereof, that they are therefore of a minimum length, and that by their specific construction and arrangement they avoid setting up any eddying currents and the consequent retarding effect thereof, the direction of movement of the circulating fluid being in no wise changed, but being continued in a uniformly circular path. It is also to be noted that in the preferred arrangement of the parts, the motor is rendered inactive in the high speed arrangement of the parts, that is farthest away from the wheel to be driven, while the motor which is nearest to the driven wheel is continuously in operation when the pump and motor mechanism are coupled, vibrations and torsional strains being thereby materially reduced.

It is to be understood that various changes may be made in the construction, arrangement and relative proportions of the parts without departing from the scope of my invention as defined in the appended claims.

Having thus described the invention, what is claimed as new is:

1. In hydraulic transmission mechanism, a pump, a motor, a speed controlling valve interposed between the pump and motor and controlling the communication between the two, and a reversing valve mechanism interposed between the pump and speed controlling valve, said reversing valve mechanism including a casing with pairs of opposite ports and a longitudinally slidable piston in said casing, said piston being formed with grooves and cross passages, the grooves being spaced from each other a distance equal to the distance between the pairs of opposite ports of the casing, and the cross passages terminating correspondingly at a distance apart equal to the distance between said pairs of ports, for the purpose specified.

2. In hydraulic transmission mechanism, a pump, a pluraltiy of motors, a speed controlling valve mechanism interposed between the pump and the motors, said valve mechanism including a spool formed with branch passages extending therethrough and arranged to establish communication between the pump and both motors simultaneously, the spool being also formed with peripheral grooves extending longitudinally and arranged to connect the outlet and inlet ports of the respective motors and pump, whereby to permit them to run free and independent of each other, the spool being further formed with another groove arranged to permit one motor to run free and disconnected from the pump with the valve in such position that its transverse passages will establish communication between the other motor and the pump.

3. In hydraulic transmission mechanism, a pump, a motor, a speed controlling valve interposed between the pump and motor and controlling the communication between the two, and a reversing valve mechanism also interposed between the pump and motor, said reversing valve mechanism including a cylinder with opposite ports, and a longitudinally movable piston in said cylinder, the piston being formed in its periphery with annular grooves and with cross passages, for the purpose specified.

4. In hydraulic transmission mechanism, a pump, a motor, a speed controlling valve interposed between the pump and motor and controlling the communication between the two, and a reversing valve mechanism also interposed between the pump and motor, said reversing valve mechanism including a cylinder with opposite ports, and a longitudinally movable piston in said cylinder, the piston being formed in its periphery with annular grooves and with cross passages, the piston being further formed with displacement passages extending therethrough from end to end.

5. Hydraulic transmission mechanism comprising a pump, a motor, a cylindrical valve casing disposed between the pump and the motor having spaced ports in its walls near each end, one port near each end being in communication with the pump and the other port being in communication with the motor, a reversing valve slidable longitudinally in said casing and provided near each end with a duct disposed in a radial plane of the valve to directly connect the ports at the adjacent end of the valve casing, said valve being further provided with a pair of diagonally extending ducts disposed in offset relation to the first-mentioned ducts and each adapted to connect that port at one end of the casing which is in communication with the pump with that port at the opposite end of the casing which is in communication with the motor, and means for shifting the valve whereby to bring either set of ducts into communication with the ports.

6. In hydraulic transmission mechanism, a pump, a pair of motors mounted side by side upon the same shaft, each motor having an inlet and an outlet, and a speed controlling valve mechanism interposed between the pump and motors and including a spool having a pair of Y-shaped passages extending therethrough and arranged in one position of the valve to establish communication between the outlet port of the pump and the inlet ports of both motors simultaneously and between the inlet port of the pump and the outlet ports of both motors simultaneously, the periphery of the spool being formed with circumferentially extending grooves extending one from the inlet opening of each duct whereby to permit the valve to be rotated in one direction to disestablish communication between the pump and one of the motors without disestablishing communication between the pump and the other of said motors.

In testimony whereof, I affix my signature in presence of two witnesses.

CHARLES C. RICH. [L. S.]

Witnesses:
W. N. WOODSON,
FREDERICK S. STITT.